H. GOTTSCHALK.
BAKER'S OVEN.
APPLICATION FILED MAY 2, 1913.
1,137,711.
Patented Apr. 27, 1915.
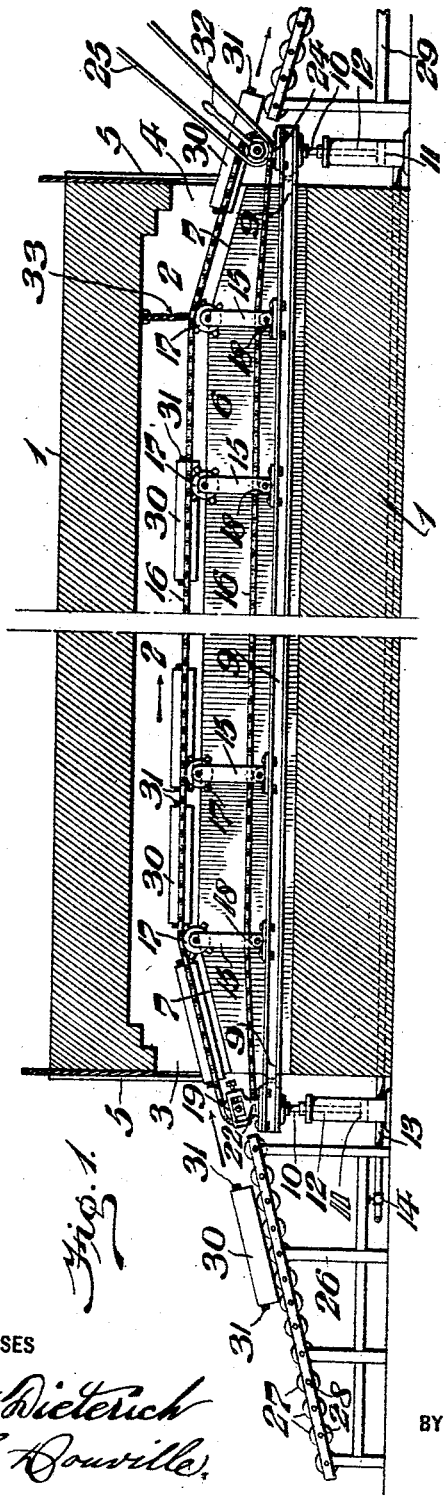
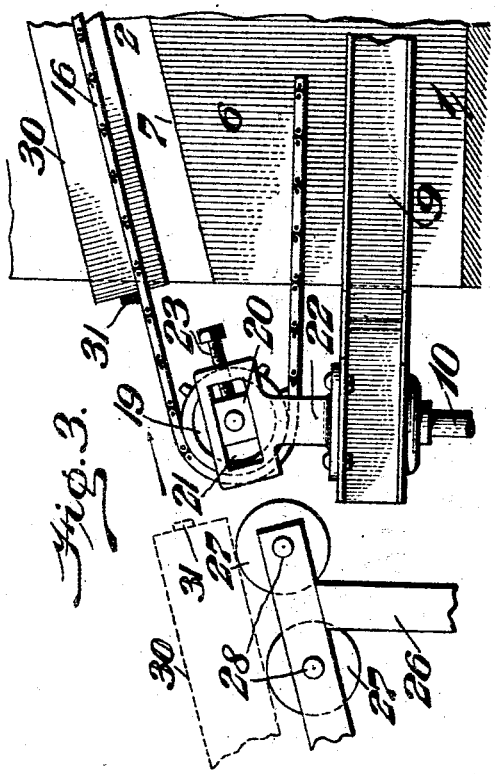
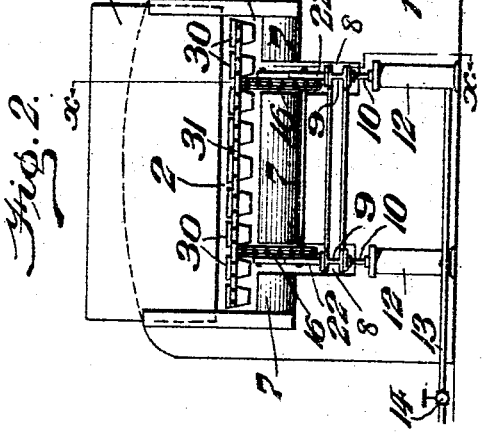
WITNESSES
INVENTOR
Hugo Gottschalk
BY Wiedersheim & Fairbanks
ATTORNEYS

UNITED STATES PATENT OFFICE.

HUGO GOTTSCHALK, OF BURNHAM, PENNSYLVANIA, ASSIGNOR TO GOTTSCHALK AUTOMATIC BRICK OVEN COMPANY, INC., OF NEW YORK, N. Y., A CORPORATION OF NEW YORK.

BAKER'S OVEN.

1,137,711.

Specification of Letters Patent. Patented Apr. 27, 1915.

Application filed May 2, 1913. Serial No. 765,027.

*To all whom it may concern:*

Be it known that I, HUGO GOTTSCHALK, a citizen of the United States, residing at Burnham, county of Mifflin, State of Pennsylvania, have invented a new and useful Baker's Oven, of which the following is a specification.

This invention relates to bakers' ovens and more particularly to an oven in which the dough is fed into the oven at one side and is delivered from the opposite side as a baked product.

It has for an object to provide an oven having a conveyer mechanism operatively mounted therein and passing from one side thereof to the other, the said mechanism serving to support and carry the dough containers through the oven. It is also arranged in such a manner that it may be brought to rest during the baking operation and its position changed relative to the hearth in order to bring the dough containers into contact relation with the floor of the oven during the baking process.

It has for a further object to provide a pressure fluid control device operating in conjunction with the aforesaid conveyer mechanism, and which is set into operation at certain predetermined times to vary the relative positions of the conveyer mechanism with respect to the hearth or floor of the oven.

It further consists of other novel features of construction, all as will be hereinafter fully set forth.

For the purpose of illustrating the invention, I have shown in the accompanying drawings one form thereof which is at present preferred by me, although it is to be understood that the various instrumentalities of which my invention consists can be variously arranged and organized, and that my invention is not limited to the precise arrangement and organization of these instrumentalities as herein shown and described.

Figure 1 represents a vertical section on line *x—x* Fig. 2, of an oven embodying my invention. Fig. 2 represents an end elevation of the same. Fig. 3 represents an enlarged detail of the receiving end of the oven.

Similar numerals of reference indicate corresponding parts in the figures.

Referring to the drawings 1 designates the inclosing wall of a baker's oven formed of brick work or like material and which is provided with the longitudinally arranged oven chamber 2. This chamber 2 in the present instance has communication at one end with the mixing room of a bakery while at the other end it is in communication with the bread room, suitable openings 3 and 4 being provided and controlled respectively by the doors 5. The construction above described is an important feature since thereby it is possible to place the dough to be baked into the oven at one end and deliver it at the other end as a baked product, thus avoiding the confusion and delay incident to feeding and delivering the dough and product at the same end.

6 designates the oven floor or hearth which is formed with an inclined way 7 at each end in order to confine and prevent the escape of heat when one or the other of the doors 5 are open. Longitudinally disposed of the hearth 6 there is a pair of channels 8 which extend a suitable distance below the floor of the oven and serve to receive the supports or beams 9 for a conveyer mechanism which will hereinafter be described. In my preferred construction there is one beam 9 located in each channel 8 and preferably projecting therefrom at each end in order to seat upon a movable support independent of the oven walls 1. As here shown, the ends of the respective beams 9 are carried by a piston rod 10 having its piston or plunger 11 slidingly mounted within a fixed cylinder 12. The cylinders 12 are connected to and have communication at or near the bottom with a pressure fluid line or pipe 13, control of which is had by means of the valve 14. This valve 14 is preferably of the three-way type to exhaust the line at certain times and is located adjacent the inlet opening 3 or feeding end of the oven and in a position convenient for ready operation. When the valve 14 is open pressure fluid from a suitable source is simultaneously admitted beneath all of the pistons 11 consequently moving the rods 10 and thereby raising the beams 9, so that the conveyer mechanism may be brought above the floor of the oven.

15 designates suitable posts or standards secured to each beam 9 at certain intervals and preferably of such lengths as to cause the conveyer chain 16 to closely follow the contour of the hearth or oven floor. It will be noted that each standard 15 serves as a journal support for the sprockets 17 which carry the conveyer chains 16 and prevent sagging intermediate the ends thereof. Each standard 15 is also provided with an idler 18 for the return portion of the conveyer while the tension of the said conveyer is maintained by providing an adjustable sprocket 19 for each of the chains, the said sprockets 19 being journaled in blocks 20 mounted in the slots 21 of the standards 22. A stud 23 or the like is threaded into each standard and bears against the respective blocks 20 so that the proper tension is always maintained in both conveyer chains.

24 designates the driving sprocket which receives power from the belt 25 or equivalent means.

26 designates a feed table positioned adjacent the inlet opening 3 and preferably having its supporting surface formed by transversely disposed rolls 27, the spindle or axes of which lie in an inclined plane substantially in alinement with the inclined hearth or oven surface 7. A second table of similar construction is located adjacent the discharge end of the oven as shown at 29.

30 designates a plurality of pans strapped together as shown at 31 in any well known manner to form a set or unit comprising a number of pans for the purpose intended. In mounting these pans 30 I preferably space the same so that there is sufficient clearance between the adjacent pans to receive the conveyer chains 16 and allow the straps 31 to rest upon the said chains, and the weight of the set of pans when filled with dough is sufficient to create the necessary friction for the conveyer to carry the pans into and through the oven.

32 designates a belt shift for bringing the conveyer to rest at certain predetermined times as will later be explained.

It will of course be understood that any desired heating means for the oven may be employed as this forms no part of my invention.

The operation of the oven is as follows:—
The conveyer mechanism is first started by shifting the belt 25 or like driving means. The filled pans are then placed upon the table 26 and pushed into engaging relation with the conveyer chains, it being noted that the inclination is such as to correctly position the pans relative to the conveyer. As fast as one set of pans is carried forward into the oven another set follows until the capacity of the oven is reached. When this occurs the operator shifts the driving means to bring the conveyer to rest, in which position the pans are suspended above the hearth or oven floor and not in contact therewith. During the foregoing operation pressure fluid is acting on the pistons 11 thus holding the conveyer mechanism in raised position. The operator now cuts off the supply of pressure fluid and allows the cylinders 12 to exhaust gradually through the valve 14, whereupon the conveyer mechanism is gently lowered by gravity until the pans rest directly upon the oven floor. This position makes possible the baking of the dough in the correct manner since the bottom is first baked and the heat works upward through the dough as it should for the best results. When this baking is completed pressure fluid is again admitted to the cylinders 12 to remove the pans from contact relation with the oven floor, the conveyer is again started and as one set of pans is removed at the discharge end another set containing fresh dough is fed in at the receiving end. In this manner the pans are continuously fed into the oven, baked and removed therefrom while the mixing room is maintained separate and distinct from the bread room thus avoiding confusion and eliminating a large number of employees.

In order to prevent as far as possible a draft through the oven when being charged, I preferably provide a suspended baffle 33 of asbestos or like material adjacent the discharge end of the oven and which forms substantially a partition between the main oven portion and the exit end. By this construction a large amount of heat and heated vapor, otherwise wasted, is saved.

It will now be apparent that I have devised a complete unitary structure particularly adapted for the purpose intended and embodying a simple and effective construction to the desired end.

It will further be apparent that the pans of dough are automatically carried or conveyed into and through the oven whereby the oven may be filled economically and with great facility. Furthermore the end is attained of simultaneously discharging the baked product while the feeding or filling operation is in progress, operative at opposite sides of the oven working in unison and as fast as one set of pans is delivered another set is placed in the oven. Thus when all the pans containing baked bread are removed the oven is again in charged condition and the doors may be immediately closed and the new charge become baked.

Attention is especially directed to the combined feature of the intermittently traveling conveyer and its raising and lowering construction as thereby not only may the pans be automatically fed but also brought into contact with the oven floor for baking purposes when the conveyer is at rest.

I am aware that it has heretofore been proposed in the patent to Pfenninger No. 473,018, April 19, 1892, to provide rails for supporting the pans in a baker's oven in such a manner that their position relative to the oven floor may be varied and in the patent to De Vaughn No. 943,395, December 14, 1909, to employ a conveyer passing through an oven. It is, however, desirable in the commercial manufacture and practical use of devices of this character, that the parts be made simple and strong and constructed in such a manner that they may be readily operated by unskilled labor without undue manipulation of a multiplicity of parts.

My present invention is clearly differentiated from the Pfenninger and De Vaughn constructions aforesaid, as will be apparent to those skilled in the art, since the same embodies a conveyer mechanism which not only feeds the dough pans through the oven, but is intermittently operable and has a movement transverse to its movement through the oven.

It will further be noted that the entire conveyer mechanism and its adjuncts are independent of and entirely separate elements from the oven structure, and therefore should any repairs be necessary at any time, it is a simple matter to disconnect the adjacent beams at one end, so that the entire conveyer mechanism may be drawn out of the oven for repair or adjustment of parts. The advantage of this construction will be readily apparent, since heretofore ovens having track rails or conveyer mechanism therein have such parts secured or connected to a part of the hearth or oven structure, and therefore in case of repair, it has been necessary to shut down the oven and wait several days for it to cool sufficiently to allow workmen to enter the oven and make the repairs necessary. By my present invention, I have avoided all this unnecessary delay and inconvenience in making adjustments or repairs.

It will now be apparent that I have devised a novel and useful construction of a baker's oven, which embodies the features of advantage enumerated as desirable in the statement of the invention and the above description, and while I have, in the present instance, shown and described a preferred embodiment, it is to be understood that the same is susceptible of modification in various particulars without departing from the spirit or scope of the invention or sacrificing any of its advantages.

Having thus described my invention, what I claim as new and desire to secure by Letters Patent, is:—

1. In a bread baking oven, the combination with a heating chamber, and a hearth or floor for said oven, of a plurality of chain conveyers operatively positioned with respect to said hearth and spaced apart to support a container through the oven, means for actuating said chains and for starting and stopping the travel thereof, a container adapted to be supported upon said chains, and means for raising and lowering said container to deposit the same upon the upper surface of said hearth, in such manner as to cause the same to rest directly upon said surface during the stationary condition of said chains.

2. In a bread baking oven, the combination with a heating chamber, and a hearth or floor for said oven, of a plurality of chain conveyers operatively positioned with respect to said hearth and spaced apart to support the container through the oven, means for actuating said chains and for starting and stopping the travel thereof, a container adapted to be supported upon said chains, and means for raising and lowering said chains to deposit the container supported thereby, directly upon the surface of the hearth and in such manner as to cause the same to rest directly upon said surface during the stationary condition of said chains.

3. In a bread baking oven, the combination with a heating chamber, and a hearth or floor for said oven, of a plurality of chain conveyers operatively positioned with respect to said hearth and spaced apart to support a container through the oven, means for actuating said chains and for starting and stopping the travel thereof, a container adapted to be supported upon the chains to depend therefrom below said chains, and means for raising and lowering said chains to deposit the container carried thereby directly upon the upper surface of said hearth and to rest thereupon during the stationary condition of said chains.

4. In a device of the character stated, the combination with an oven having a heating chamber therethrough, and a hearth or floor for said oven having recesses formed therein extending the length of said chamber and spaced apart, of a plurality of chain conveyers mounted for movement through said oven and through said recesses and adapted to support containers thereon, supports for said chain conveyers, a frame mechanism carrying said supports, seated in said recesses and extending beyond the ends of said oven, means for actuating said chain conveyers and for starting and stopping the travel thereof, and means for raising and lowering said frame and supports, whereby said chains are raised and lowered with respect to said hearth to deposit the containers carried thereby directly upon the surface thereof and to rest thereupon during the stationary conditions of said chains.

5. In a device of the character stated, the combination of an oven, having a heating chamber therethrough and a hearth or floor for said oven, having recesses formed therein extending throughout the length of said chamber and opening to the outside at either end and spaced apart, of a plurality of chain conveyers mounted for movement through said oven and through said recesses and adapted to support a container thereon to depend below the conveyers, supports for said chain conveyers, a frame mechanism carrying said supports, seated in said recesses and movable therethrough and extending beyond the ends of said oven, means for actuating said chain conveyers and for starting and stopping the travel thereof, and means free and independent of the oven for supporting said frame and the mechanism carried thereby, whereby said frame and coacting mechanism may be easily and quickly removed from the oven, said supporting means adapted to raise and lower said frame and the supports carried thereby, whereby said chains are raised and lowered with respect to the said hearth to deposit the containers carried thereby directly upon the surface thereof, and to rest thereupon during the stationary condition of said chains.

6. In a device of the character stated, the combination of an oven having a heating chamber, a hearth or floor for said oven, a conveyer mechanism operatively mounted with respect to said hearth, means to drive said conveyer, means to vary the relation of said conveyer to said hearth, and a dough container adapted to be carried by said conveyer the bottom of said container being situated in a plane below the plane of said conveyer whereby the said container is positioned, when said conveyer is lowered, to contact with and rest upon said hearth.

7. In a baking oven, the combination with a heating chamber and a hearth or floor for said oven, of a movable carrier operatively mounted with respect to said hearth, means to actuate said carrier and for starting and stopping the travel thereof, a container adapted to be supported by said movable carrier, and means to vary the relation of the container and hearth to cause the container to contact with and to rest directly upon the surface of the hearth.

HUGO GOTTSCHALK.

Witnesses:
 ROBERT M. BARR,
 C. D. MCVAY.